US007147174B2

(12) United States Patent
Mansen

(10) Patent No.: US 7,147,174 B2
(45) Date of Patent: *Dec. 12, 2006

(54) COMMINUTING DEVICE

(76) Inventor: Joel D. Mansen, 20 Clematis Road, Willowdale, Ontario (CA) M2J 4X2

( * ) Notice: Subject to any disclaimer, the term of this patent is extended or adjusted under 35 U.S.C. 154(b) by 20 days.

This patent is subject to a terminal disclaimer.

(21) Appl. No.: 10/960,306

(22) Filed: Oct. 7, 2004

(65) Prior Publication Data
US 2005/0109865 A1 May 26, 2005

Related U.S. Application Data

(63) Continuation of application No. 10/121,528, filed on Apr. 12, 2002, now Pat. No. 6,834,817, which is a continuation-in-part of application No. 09/891,807, filed on Jun. 26, 2001, now Pat. No. 6,517,018.

(60) Provisional application No. 60/313,396, filed on Aug. 17, 2001.

(51) Int. Cl.
B02C 19/00 (2006.01)
(52) U.S. Cl. .................. 241/30; 241/169.1; 99/510
(58) Field of Classification Search ............. 241/169.1, 241/188.2, 30; 99/510
See application file for complete search history.

(56) References Cited

U.S. PATENT DOCUMENTS 6,517,018 B1 * 2/2003 Manson .................. 241/169.1
6,834,817 B1 * 12/2004 Manson .................. 241/169.1

* cited by examiner

Primary Examiner—Mark Rosenbaum
(74) Attorney, Agent, or Firm—Robert L. Epstein; Epstein Drangel Bazerman & James, LLP

(57) ABSTRACT

A device for comminuting material comprising first and second mating sections. The mating sections when mated form an enclosed interior chamber with the first and second sections capable of movement relative to each other. The first mating section has a first set of a plurality of pins, which extend from a base of the first mating section and into the interior of the chamber. Similarly, the second mating section has a second set of a plurality of pins extending from a base of the second mating section and into the interior of the chamber. The pins from the first mating section interdigitate with the second set of a plurality of pins when the first and second mating sections are mated, wherein movement of the first and second mating sections relative to one another causes comminution of the material when placed in the chamber. The pins have varying cross-sectional shapes including circular, triangular, and hexagonal.

8 Claims, 11 Drawing Sheets

SECTION A-A

SECTION B-B

SECTION C-C

SECTION D-D

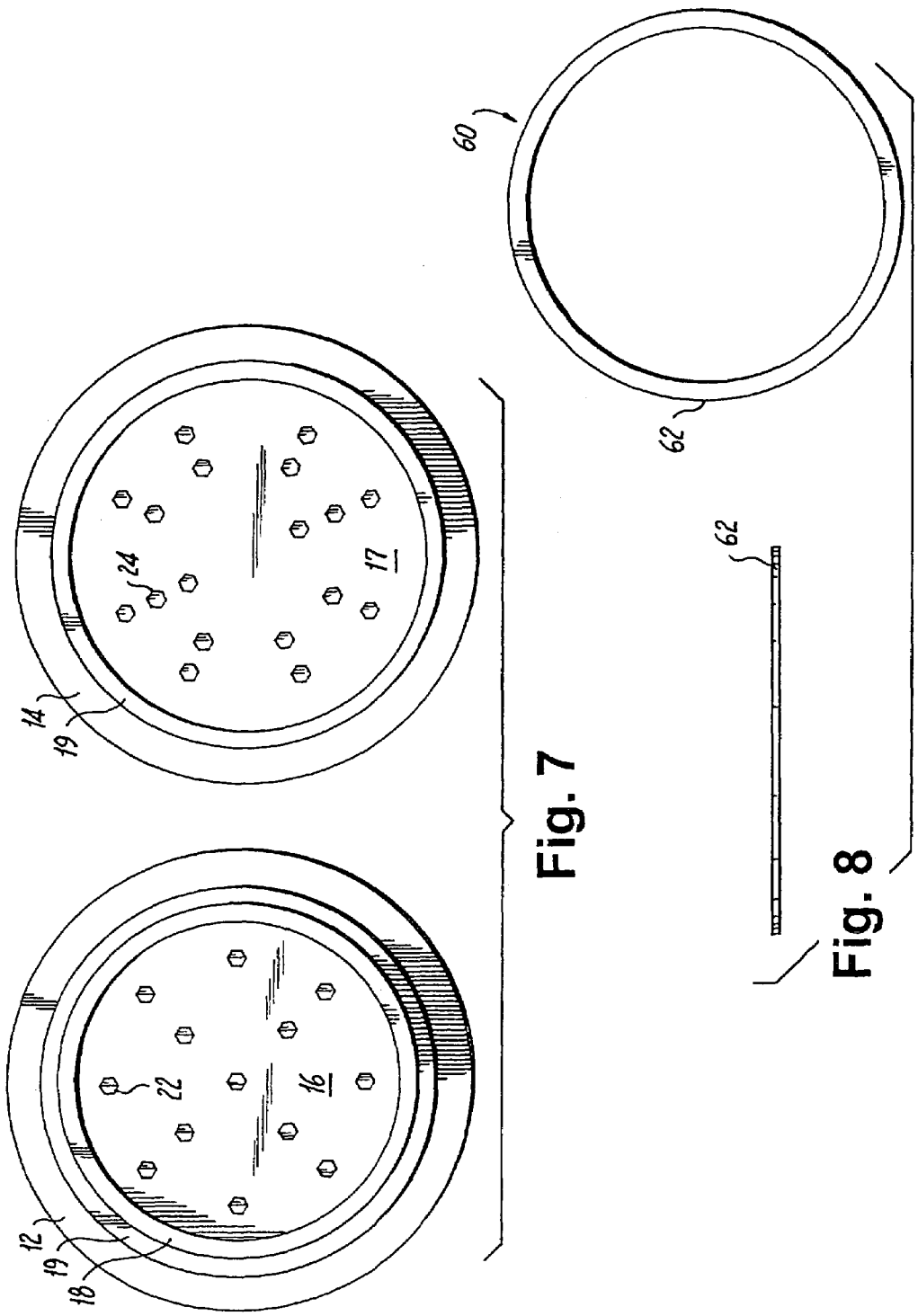

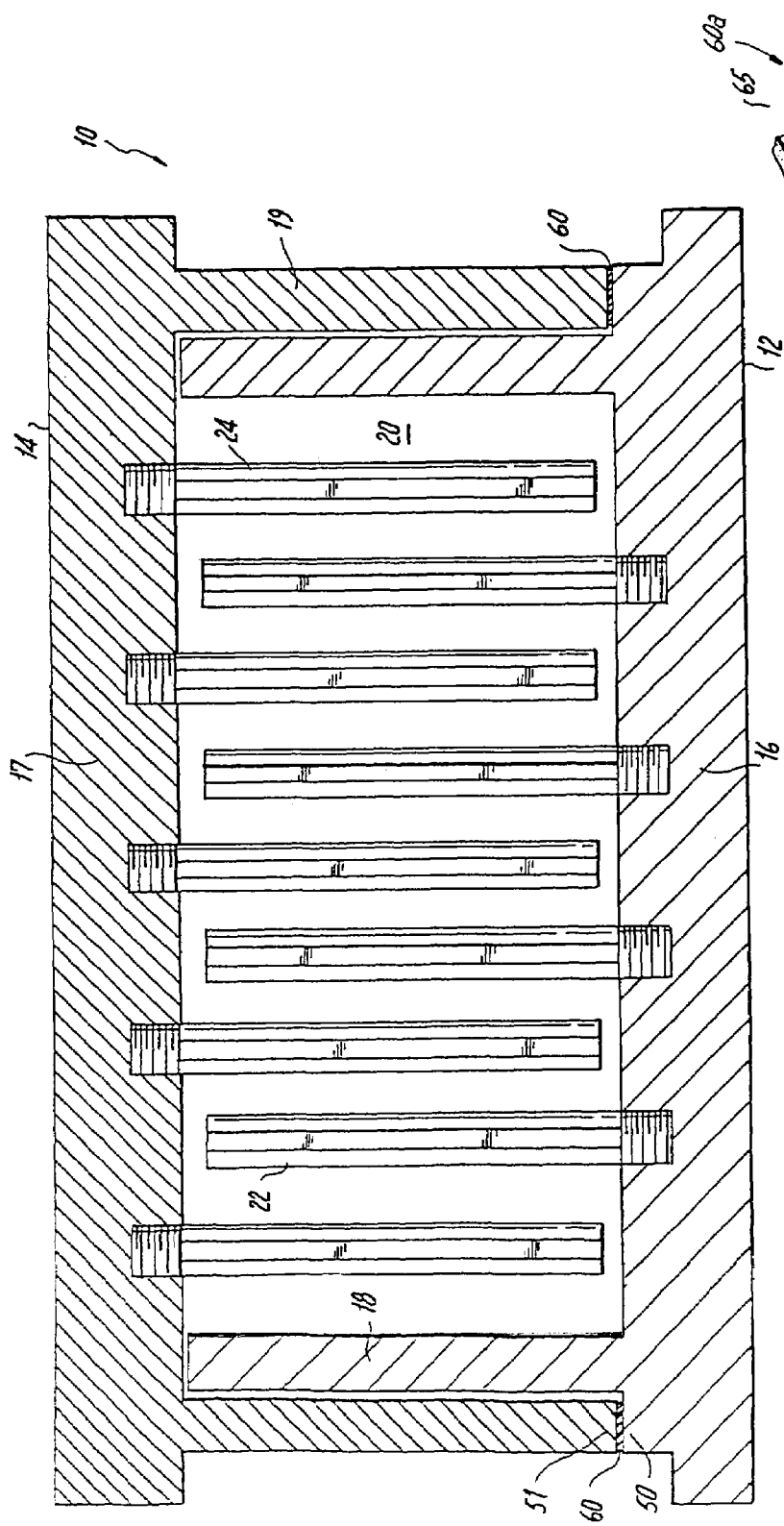

COMMINUTING DEVICE

This application is a continuation of U.S. patent application Ser. No. 10/121,528, filed Apr. 12, 2002, now U.S. Pat. No. 6,834,817, which is a continuation-in-part of U.S. patent application Ser. No. 09/891,807, filed Jun. 26, 2001, now U.S. Pat. No. 6,517,018, which is based on U.S. Provisional Patent Application No. 60/313,396, filed Aug. 17, 2001.

BACKGROUND OF THE INVENTION

1. Field of the Invention

This invention relates to the comminution of raw materials

2. Prior Art

Numerous attempts have been made for comminuting raw material into a desired particulate size. One problem with such attempts is their susceptibility to jamming. Another problem with such devices is the presence of numerous mechanical parts, each of which are susceptible to wear and tear and replacement of the individual parts can be expensive. Some of these devices are also large and thus not easily portable.

SUMMARY OF THE INVENTION

The comminuting device or, for brevity herein, the grinder, can be considered to comprise two opposed cup-like devices the base of which have pins, those on one cup extending between the pins of the other cup towards the base of that other cup. The cups have a male/female relationship with one cup, the male, fitting within the female cup. The male cup has an annular shoulder against which the upper edge of the female cup bears when the two cups are fully engaged.

The mating sections when mated form an enclosed interior chamber with the first and second sections capable of movement relative to each other. The first mating section has a first set of a plurality of pins, which extend from a base of the first mating section and into the interior of the chamber. Similarly, the second mating section has a second set of a plurality of pins extending from a base of the second mating section and into the interior of the chamber. The pins from the first mating section interdigitate with the second set of a plurality of pins when the first and second mating sections are mated, wherein movement of the first and second mating sections relative to one another causes comminution of the material when placed in the chamber.

According to another embodiment of the present invention, there is provided a plurality of pins having at least one planar facet, more preferably be multi-planar faceted, and most preferably be either triangular or hexagonal. The first and second sets of a plurality of pins are preferably substantially perpendicular to the base of their respective mating sections, although the pins can also be placed at an angle relative to the base. If the pins are angled, the angle at which the first set of a plurality of pins is placed relative to the base of the first mating section is complementary to the angle at which the second set of a plurality of pins is placed relative to the base of the second mating section.

In yet another embodiment, the pins are removably fixed to their respective bases, thus allowing pins of various shapes and sizes to be easily inter-changed.

In yet another embodiment, a method of determining the configuration of a plurality of pins in a cylindrical comminuting device having a first and second mating section, the method comprising the steps of:

1) determining the configuration in a first mating section of a first set of a plurality of pins by:

a) selecting parameters of the first mating section such that the relationship $$D=(n)(d)+S(n-1)+2F$$

is satisfied;

b) determining the maximum number of orbits, O, of said pins for the mating sections such that $$O=(n-1)/2;$$

where parameter:

D is an internal diameter of the first mating section, d is the maximum cross-sectional distance of a pin, S is the minimum distance between a pair of interdigitating adjacent pins, n is the total integral odd number of interdigitating pins along a major axis of said mating sections, 2) determining the radius of each orbit when said first and second sections are mated such that $$2R=2(n)(d+S),$$

where parameter:

R is the radius of an orbit, n is the nth orbit; and 3) configuring a second set of a plurality of pins in a second mating section such that the first set of pins and second set of pins have a distance S when said first and second sections are mated and said first mating section having even $R_n$ orbits and said second mating section having odd $R_n$ orbits.

The invention also provides for a kit for comminuting material, wherein such kit comprises first and second mating sections. The first and second mating sections when mated are capable of forming an enclosed interior chamber with the sections capable of movement relative to each other. A plurality of sets of pins capable of being removably fixed to a base each of the first and second mating sections; are also provided with the kit.

In another embodiment, the sets of pins to be included with the kit comprise a plurality of sets of pins for both the first and second mating sections and further comprise pins of a plurality of shapes and sizes.

The invention also provides for a gasket which alleviates the problem of damage to the cups due to different rotational movements. The problem is reduced by the introduction of a tough, low-friction material between the rubbing surfaces. Such a material could, for example, be TEFLON® applied to one or both of the rubbing surfaces.

The surfaces are smooth and rotation with gentle axial pressure causes effective grinding of materials placed in the male cup. However, due to irregularities in different people's rotational movements (i.e. unnecessary pressure applied, pieces not axially aligned) a gasket/washer of low friction (i.e. Teflon®, PVC) is designed to complement the comminuting device/grinder. Thus the gasket will provide a practical solution for the irregularities of manual implementation. These irregularities can cause damage to the shoulder surface of the male cup and the matching surface of the female cup (the rubbing surfaces).

To prevent such change, an annulus (washer) of low-friction material may be placed on the male cup to seat against the shoulder surface. Preferably, the washer should fit snugly against the neck adjacent to the shoulder to resist the tendency for it to be separated from the shoulder. The washer may have a flange at a 90 degree angle to the annular portion of the washer to protect the inner surface of the female and outer surface of the male cups and to minimize the friction between them.

To aid holding the washer in place, there may be a groove at the base of the wall of the male cup. The washer may then have a ridge protruding on the flange at the corner where the flange and annular portion meet. The ridge will fit into the groove of the male cup thereby holding the washer in position.

BRIEF DESCRIPTION OF THE DRAWINGS

These and other features of the preferred embodiments of the invention will become more apparent in the following detailed description in which reference is made to the appended drawings by way of example only, wherein:

FIG. 7 is a further embodiment of the device of FIGS. 2 and 3;

FIG. 8 is a top and side view of the flat washer;

FIG. 9 is an axial cross-section of the grinder of FIG. 1 with a flat washer;

FIG. 10 is a cross-section of the washer having a flange at a 90 degree angle;

DETAILED DESCRIPTION OF THE INVENTION

Figure 1:
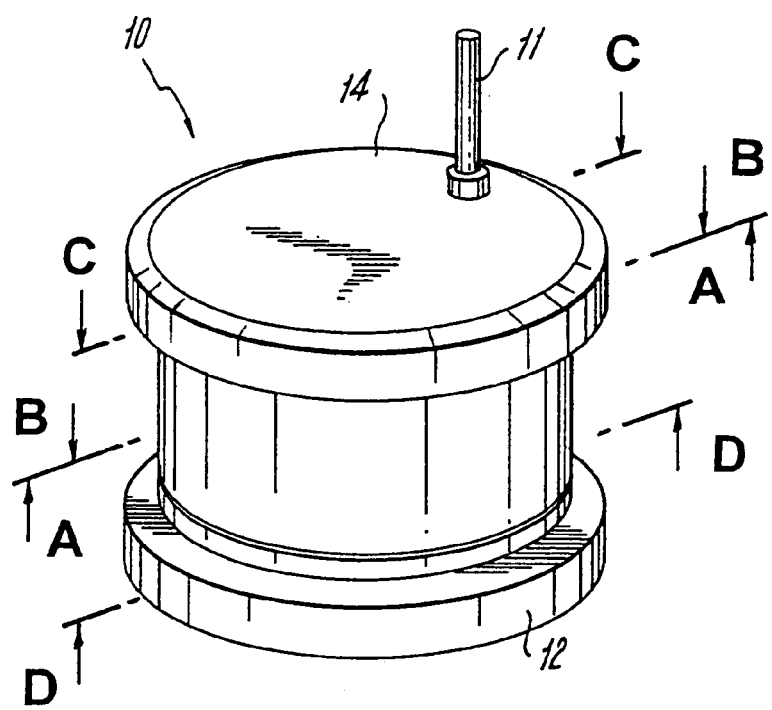
FIG. 1 is a perspective view of an assembled comminuting device.
Figure 2:
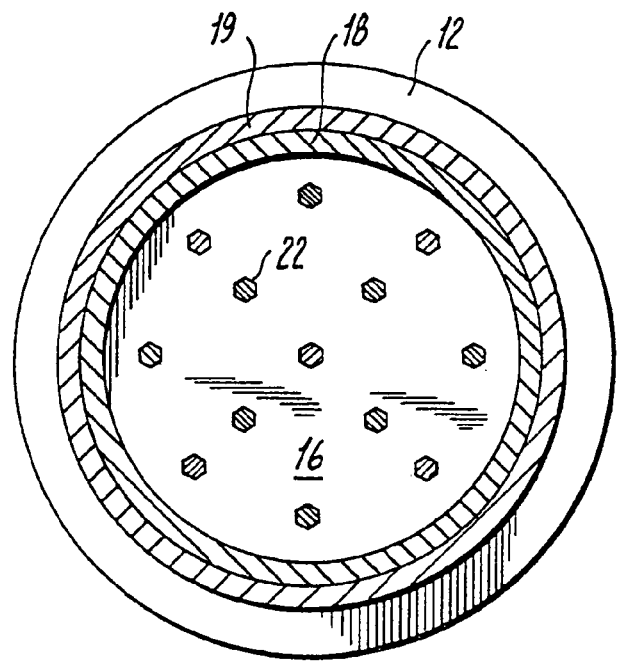
FIG. 2 is a section view on A—A of FIG. 1.
Figure 3:
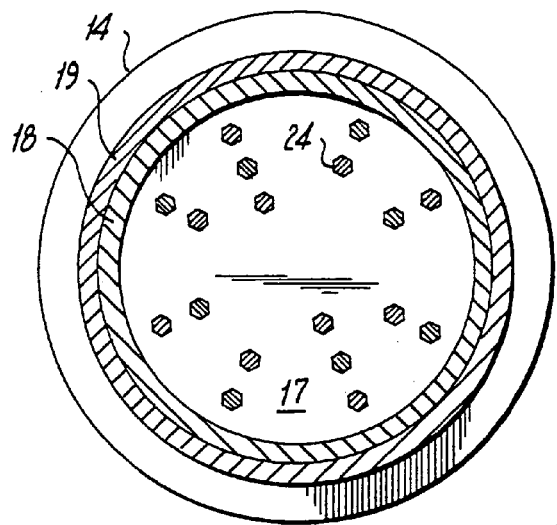
FIG. 3 is a section view on B—B of FIG. 1.

Referring to FIG. 1, the device is generally shown at 10. The device includes a first mating section 12 and a second mating section 14 shown in FIGS. 2 and 3 respectively. Each of mating sections 12,14 have a respective base 16,17 and a respective wall 18,19, which are substantially perpendicular to the base 16,17. Mating sections 12,14 when assembled form a fully enclosed chamber 20 shown in FIG. 6. Each of mating sections 12,14 have a set of a plurality of pins 22,24 which are capable of either being permanently or removably fixed to base 16,17 of mating sections 12,14 respectively. It is preferred that pins 22,24 be substantially perpendicular to the base 16,17. A handle 11 can be connected to at least one of the mating sections 12, 14 to facilitate operation of the device 10.

Figure 13:
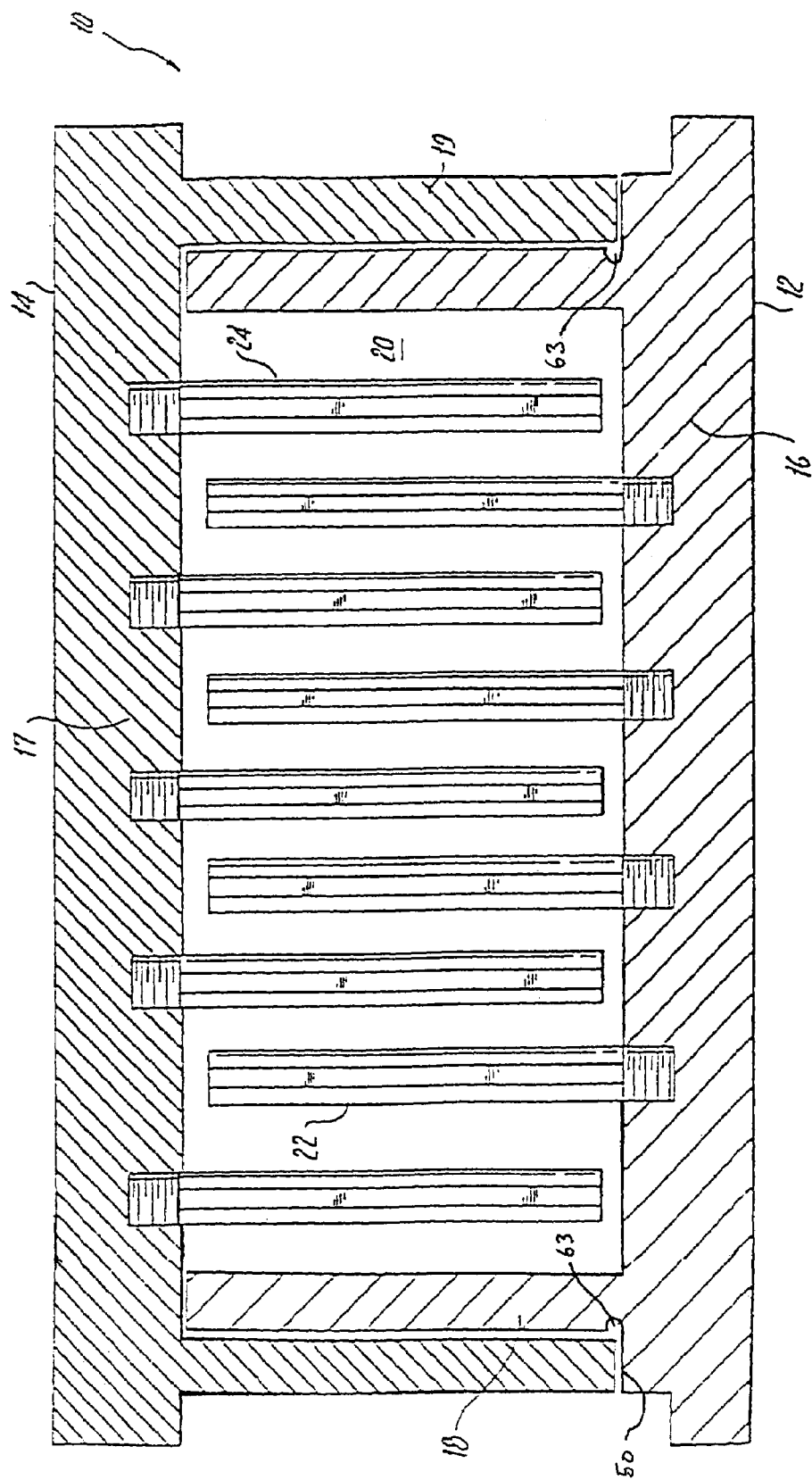
FIG. 13 is a section view on D—D of FIG. 1 having a groove at the base of the wall.
Figure 14:
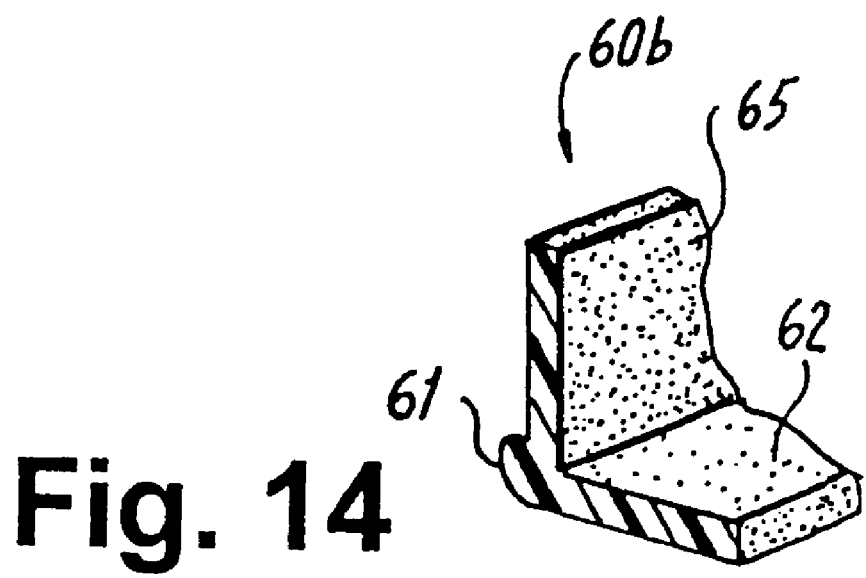
FIG. 14 is a cross-section of the washer having a flange at a 90 degree angle and a ridge.
Figure 15:
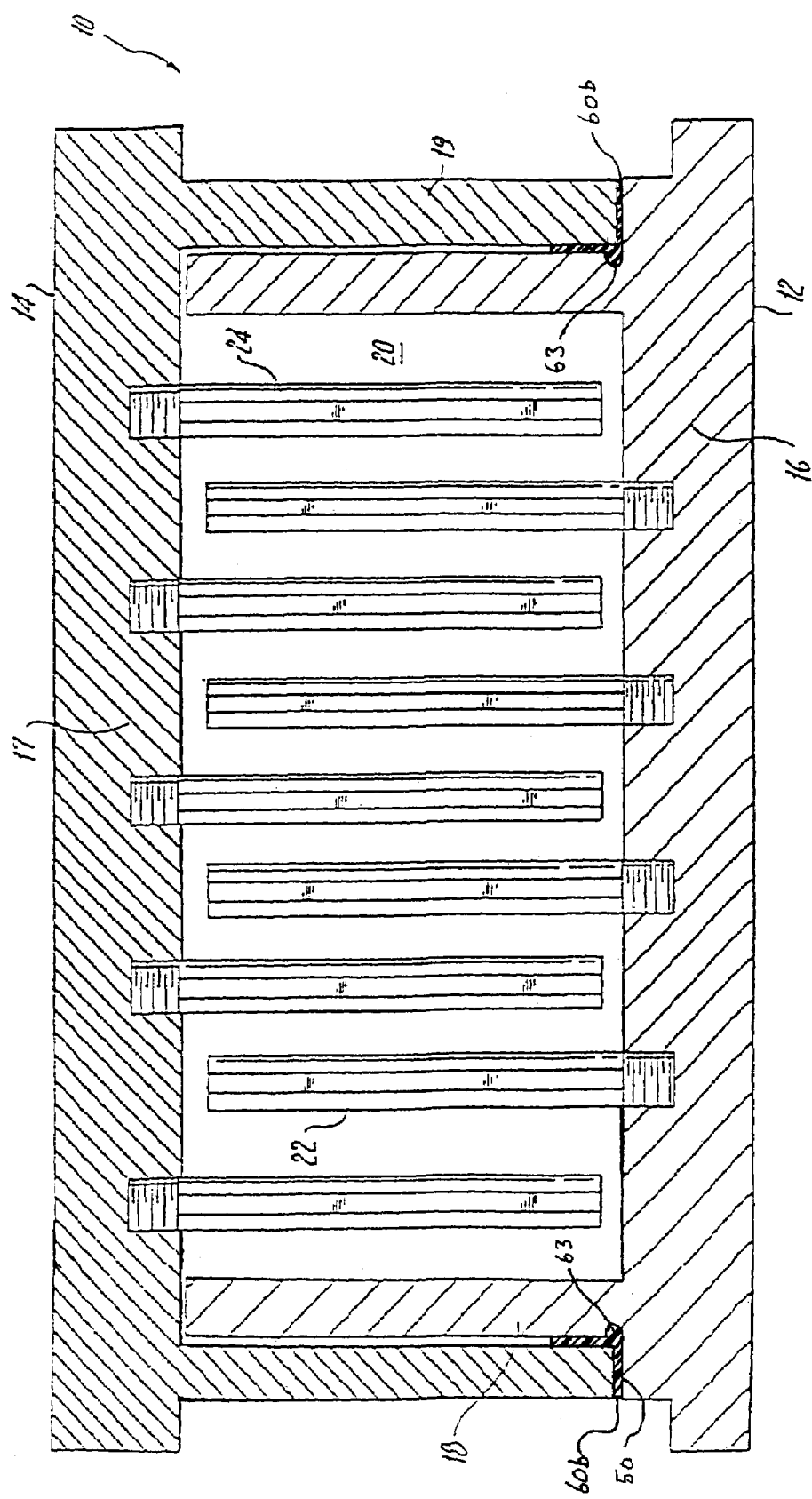
FIG. 15 is an axial cross-section of the grinder of FIG. 1 with a 90 degree washer having a flange and a ridge.

As seen in FIG. 13, another embodiment of the invention has a groove 63 located at the meeting point of the base 16 and the wall 18 of the first mating section 12.

Figure 4:
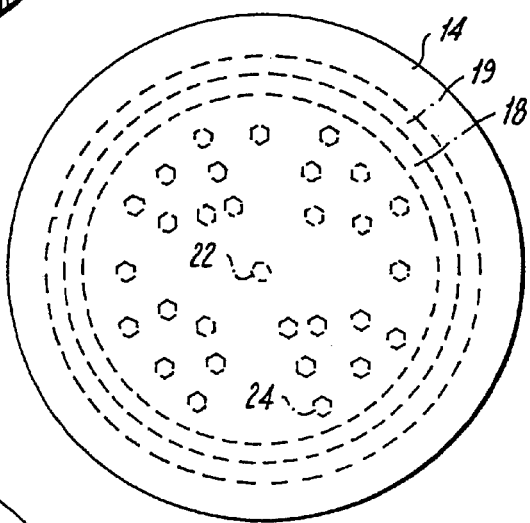
FIG. 4 is a section view on C—C of FIG. 1 in a first orientation.
Figure 5:
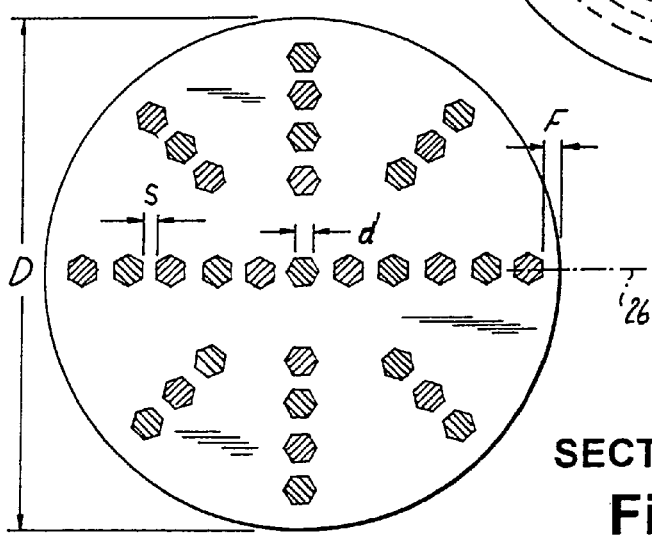
FIG. 5 is a section view on C—C of FIG. 1 in a second orientation.
Figure 6:
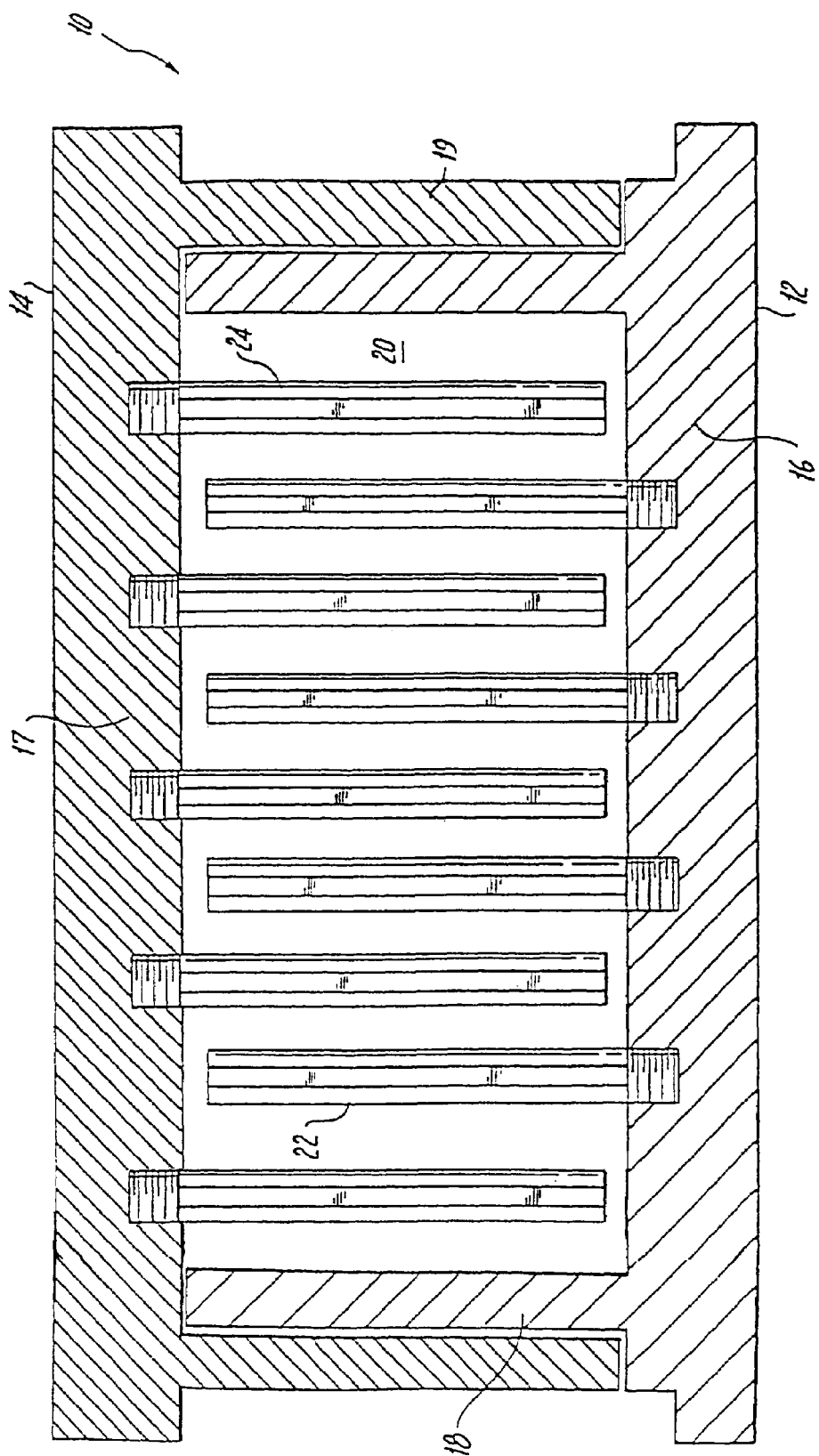
FIG. 6 is a section view on D—D of FIG. 1.
Figure 11:
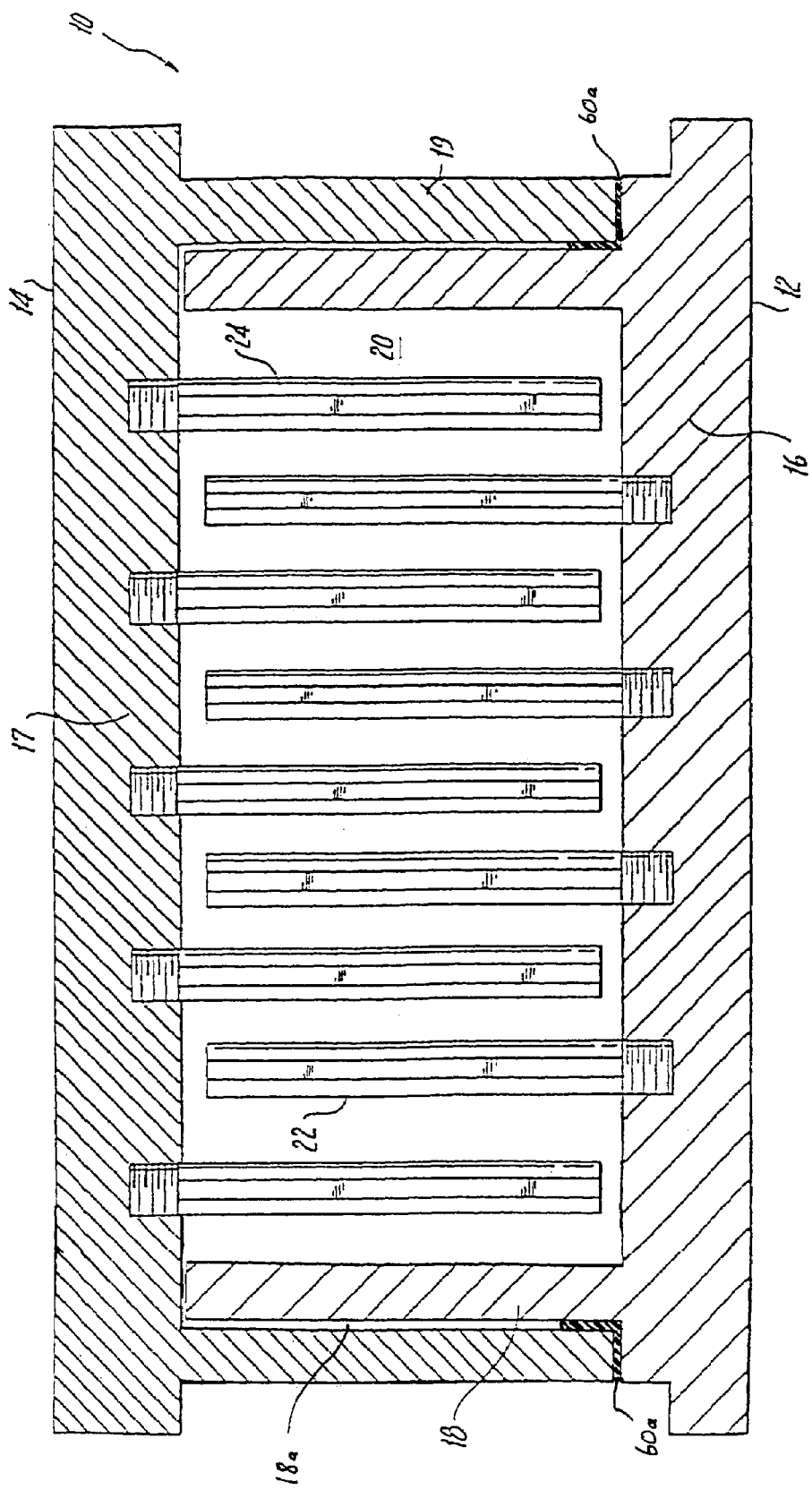
FIG. 11 is an axial cross-section of the grinder of FIG. 1 with a 90 degree washer having flange.

When mating sections 12,14 are assembled to form device 10, pins 22,24 interdigitate as shown in FIG. 6. In another embodiment, device 10 is cylindrical, such that mating sections 12,14 are capable of 360. degree. movement each relative to the other. The position of pins 22,24 relative to each other in two orientations of the mating sections 12,14 can be seen in FIGS. 4 and 5. Pins 22,24 may also be removably fixed at an angle to base 16,17. When fixed at an angle, pins 22,24 are at angles complementary to each other, thereby allowing free movement of each mating section 12,14 relative to each other over 360. degree., or other degree of movement configurations as desired. Although it is preferable that base 16,17 be substantially planar, one of the bases 16,17 may also be dome shaped, allowing for a chamber with a larger volume. In such an embodiment, the pins 22,24 extending from the center of the dome shaped section can be longer than the pins extending from the periphery of the dome.

In one embodiment, the wall 18 of the first or male mating section 12 is smaller in diameter than wall 19 of the second or female mating section 14, thus allowing for the female mating section 14 to be slidably engaged over the male mating section 12.

In one embodiment, the pins 22,24 are cylindrical. Alternatively, the pins 22,24 can be of any polygonal shape. For example, in one embodiment, the pins 22,24 are hexagonal in cross-section. It has been found that the edges between the facets of the hexagon facilitate the interactions between material and the pins 22,23 and thereby providing more efficient comminuting of material when compared to comminuting of material with cylindrically shaped pins. The pins 22,24 may also be, but not limited to other faceted pins 22,24 such as triangular or pentagonal in cross-section. The pins 22,24 may be manufactured out of any material as long as the pins do not snap off when the device 10 is in operation. Such materials may include but are not limited to titanium, aluminum and alloys of metals. The pins 22, 24 may also be coated with substances such as teflon, chromium, gold or silver. If the comminuting device 10 is to be used for material that is to be consumed, the coating should be bio-compatible. The material for comminution can be such as but not limited to herbs, nuts, granular spices, and food stuffs or condiments for which mechanical processing is desired.

To operate the device 10, the material to be comminuted is placed in either mating sections 12,14. While the material to be comminuted can be placed in either sections 12,14, it is preferable that the material be placed in the male mating section 12 first. This will allow proper placement of the female mating section 14 over the male mating section 12 without any interference from the material to be comminuted. In order to now comminute the material, the sections 12,14 are moved relative to each other, until the size of the particulate material desired is obtained. Of course, the distance between the interdigitating pins 22,24 must be smaller than the original size of the material to be comminuted. If smaller particulate material is desired, one only has to transfer the already comminuted material to a new device 10 in which the distance between the interdigitating pins is smaller than the one before, or the pins 22,24 can be removed and replaced by pins with a larger cross-sectional diameter, thus making the distance between the interdigitating pins smaller. In one embodiment where the sections 12,14 are cylindrical, the sections can be moved 360. degree. relative to one another. Alternatively, the circular sections can also be translated back and forth in a somewhat linear fashion to comminute the material in chamber 20. If the sections 12,14 are rectangular, the sections 12,14 can be translated back and forth along a selected axis.

In one embodiment, a method is provided for determining the configuration of pins 22 in the male circular mating section 12 the method comprising the steps of:

1) determining the configuration in a first mating section of a first set of a plurality of pins by:

a) selecting parameters of the male mating section 12 such that the relationship $$D=(n)(d)+S(n-1)+2F$$

is satisfied;

b) determining the maximum number of orbits, O, of the pins for the mating sections such that $$O=(n-1)/2;$$

where parameter:

D is an internal diameter of the male mating section 12, d is the maximum cross-sectional distance of a pin 22, 24, S is the minimum distance between a pair of interdigitating adjacent pins 22,24, n is the total integral odd number of interdigitating pins along a major axis 26 of the mating sections, and F is the distance between the pin 24 in the furthest orbit of the female section 14 and the inside of the wall of the male section 12, 2) determining the radius of each orbit when the first and second sections are mated such that $$2R=2(n)(d+S),$$

where parameter:

R is the radius of an orbit, n is the nth orbit; and 3) configuring a second set of a plurality of pins 24 in the female mating section 14 such that the first set of pins 22 and second set of pins 24 have a distance S when the male and female mating sections 12,14 are mated and the male mating section 12 has even $R_n$ orbits and the female mating section has odd $R_n$ orbits.

Accordingly, the following examples are offered by way of illustration, not by way of limitation.

EXAMPLE 1

Any size of the comminuting device and the configuration of the pins 22 in the male mating device 12 can be easily determined by using the formulas described above. Thus, if a male mating section 12 whose internal diameter, D, is 35 mm, F is 0.75 mm, and each pin 22 has a diameter, d, of 1.4 mm with a desired spacing, S, between the interdigitating pins of the assembled device of 1.6 mm, then the total integral odd number of pins required for the assembled device along the major axis of the device would be:

$$35=(n)(1.4)+1.6(n-1)+2(0.75)$$

$$35=1.4n+1.6n-1.6+1.5$$

$$35=3.0n-0.1$$

$$3.0n=35+0.1$$

$$3.0n=35.1$$

Since n should be an odd integer, the value of n is rounded off to the nearest odd integer. In this instance n should be 11. In the event that the value of n is an even number, the value of n is rounded off to the nearest odd integer. Thus, if the value of n for a different set of parameters works out to be 12.2, then n should be rounded off to the nearest odd integer. Such number could be either 11 or 13.

In this example, for 11 pins, the number of orbits, O, concentric with the central pin is determined by the formula:

$$O=(n-1)/2$$

$$O=(11-1)2$$

$$O=10/2$$

$$O=5$$

The radius, R, of each of the five (5) orbits is then determined by the formula:

$$2R=2(n)(d+S)$$

where, n is the n.sup.th orbit. Thus, the radius of the first, inner most orbit, is:

$$2R_1=2(1)(1.4+1.6)$$

$$2R_1=2(3)$$

$$2R_1=6 \text{ mm},$$

the radius of the second innermost orbit, is:

$$2R_2=(2)(2)(1.4+1.6)$$

$$2R_2=(4)(3)$$

$$2R_2=12 \text{ mm},$$

similarly, $$2R_3=18 \text{ mm}, 2R_4=24 \text{ mm, and } 2R_5=30 \text{ mm}.$$

The pins in the female mating section 14 will then be configured such that they interdigitate with the pins configured in the male mating section 12, as well as using the orbit O=5 determined above. The female mating section 14 will have orbits of radii $R_1$, $R_3$, and $R_5$, and the male mating section 12 will have orbits of radii $R_2$ and $R_4$, with the center pin in the male mating section 12 being $R_0$.

EXAMPLE 2

If it is desired to determine the internal diameter of a male mating section 12 of a comminuting device described herein, knowing that the number, n, of pins to be used is 15, and the diameter, d, of each pin is 1.38 mm, with the spacing, S, between interdigitating pins is 1.62 mm, and F is 0.75 mm, then the internal diameter, D, of the male mating section 12 can be calculated as follows:

$$D=(n)(d)+S(n-1)+2F$$

$$D=(15)(1.38)+1.62(15-1)+2(0.75)$$

$$D=20.7+22.68+1.5$$

$$D=44.88 \text{ mm}$$

The number of orbits, O, concentric with the central pin is:

$$O=(n-1)/2$$

$$O=(15-1)/2$$

$$O=14/2$$

$$O=7$$

and the radius, R, of each of the seven (7) orbits is next determined by the formula:

$$2R=2(n)(d+S)$$

where, n, is the n.sup.th orbit. Thus, the radius of the first, inner most orbit, is:

$$2R_1=2(1)(1.38+1.62)$$

$$2R_1=2(3)$$

$$2R_1=6 \text{ mm},$$

the radius of the second innermost orbit, is:

$$2R_2=(2)(2)(1.38+1.62)$$

$$2R_2=(4)(3)$$

$$2R_2=12 \text{ mm},$$

similarly, $2R_3=18$ mm, $2R_4=24$ mm, $2R_5=30$ mm, $2R_6=36$ mm, and $2R_7=42$ mm.

The pins in the female mating section 14 will then be configured such that they interdigitate with the pins configured in the male mating section 12. The female mating section 14 will have orbits of radii $R_1$, $R_3$, $R_5$, and $R_7$, and the male mating section 12 will have orbits of radii $R_2$, $R_4$, and $R_6$ with the center pin in the male mating section 12 being $R_0$.

In a further embodiment shown in FIG. 7, the device 10 has a plurality of pins 22, 24 of circular cross-section. The positioning of these pins 22, 24 on their respective bases 16, 17 can be determined by the pin configuration method as described above. It is also recognized that any modifications of the device 10 described above can be done occurring to those skilled in the art without departing from the spirit of the invention as claimed. It is also recognized that pins 22, 24 can comprise various differently shaped cross-sections for use in the single device 10.

The grinder comprises a female cup 14 and a male cup 12. Each cup has pins 22,24 projecting upwardly from its base into its interior, the pins being so disposed so that when the cups are joined, as shown in FIG. 6, the pins are so disposed that in co-operation they will grind a friable substance placed in the male member when the two cups are relatively rotated.

The male cup 12 has an annular shoulder surface 50 upon which the rim 51 of the body of the female cup bears, the shoulder surface of the male cup 12 and the rim 51 of the female cup 14 together constituting the rubbing surfaces.

In a preferred embodiment, an annulus (washer) 60 is snug-fitted about the main body of the male cup 12 and seated on the shoulder surface 50 of that cup 12. The washer 60 is a tough, low-friction materials such as Teflon®. When the cups 12,14 are united the rim surface 51 will bear on the washer 60. The presence of the washer 60 will prevent damage to either rim 51 or shoulder 50 even when excess axial pressure is applied to the cups to bring them closer or more tightly in contact.

It will be appreciated that while in this embodiment a simple Teflon washer 60 is illustrated, it is within the compass of this invention to bond any compatible low friction material to either or both of the surfaces 50, 51 to achieve the advantageous effect described.

Figure 12:
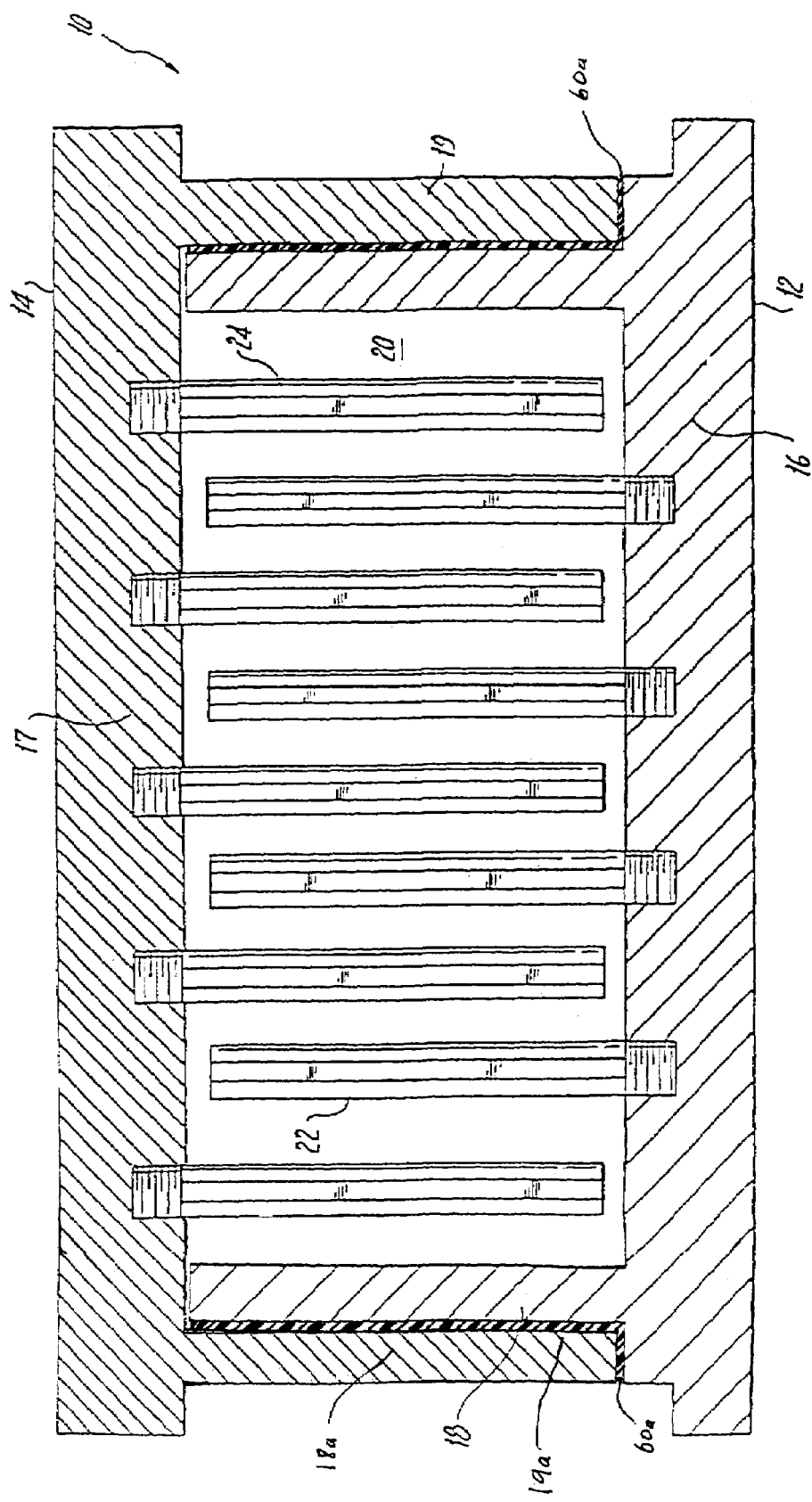
FIG. 12 is an axial cross-section of the grinder of FIG. 1 with a 90 degree washer having a flange, extending to the top of the male cup.

As seen in the figures, a washer 60a may be used with a flange 65 at a 90 degree angle with the annular section 62 which allows for protection of the rim 51 and shoulder surfaces 50 as well as the exterior wall 18a of the male cup 12 and the interior wall 19a of the female cup 14 by allowing the washer 60a to fig snugly between the male and female cups 12, 14. As an alternative embodiment, the flange may extend and equal the length of the male cup 12 exterior wall 18 thereby creating a complete friction reduction barrier between the male cup 12 wall 18 and the female cup 14 wall 19 as seen in FIG. 12. By extending to the entire length of the male cup 12 wall 18, the flange also increases the stability between the two cups 12, 14 during use.

Figure 16:
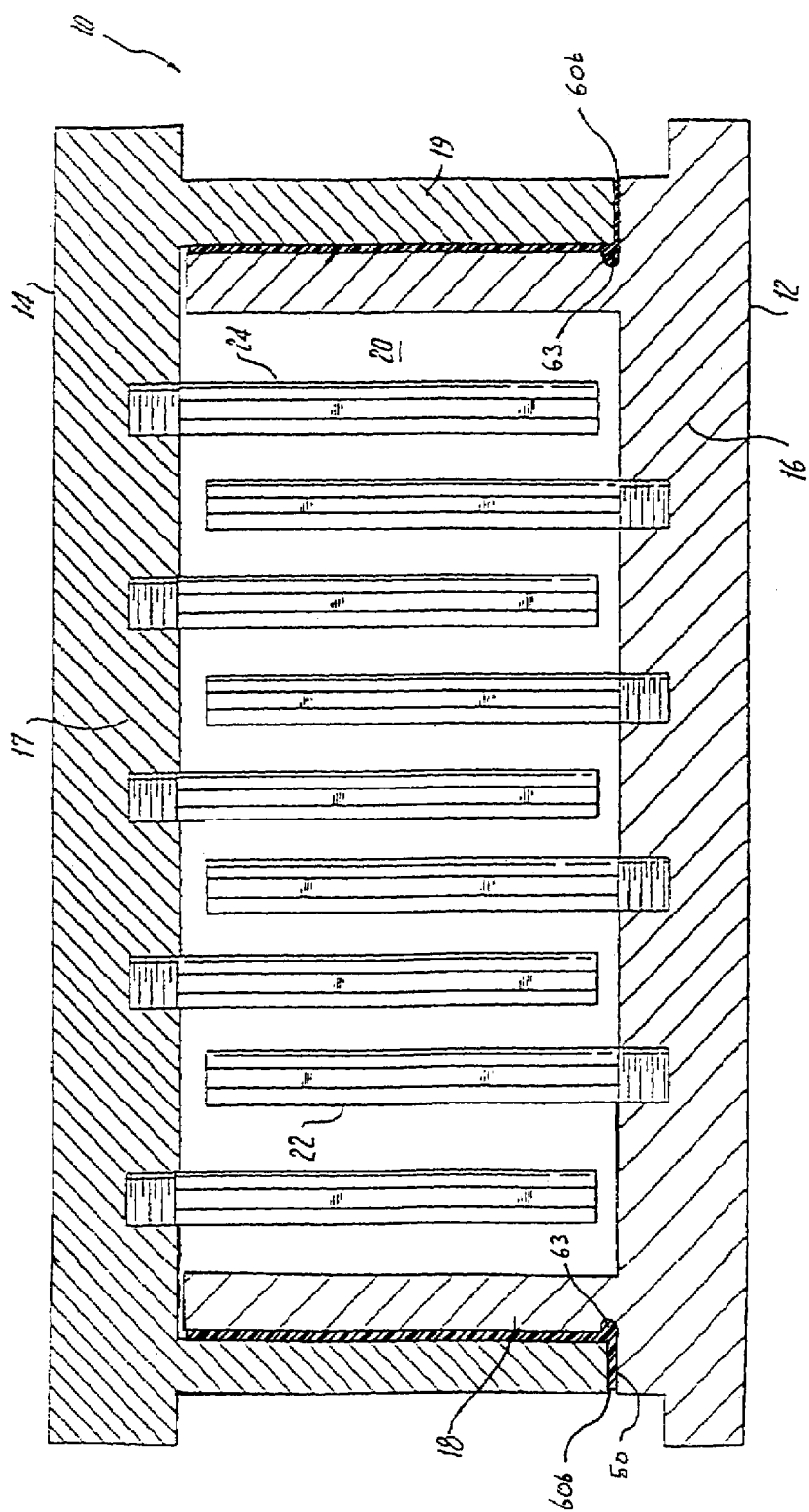
FIG. 16 is an axial cross-section of the grinder of FIG. 1 with a 90 degree washer having a flange and a ridge where the flange extends to the top of the male section.

To further aid in positioning the washer 60b, the male cup 12 may have a groove 63 positioned at the base of the wall 18 where the shoulder 50 meets the wall 18 as shown in FIG. 13. The washer 60b may have a protruding ridge 61 on the flange 65, at the point where the flange 65 and the annular portion 62 meet, to allow it to fit in the groove 63. Such placement of the ridge 61 in the groove 63 will secure the washer 60b in place during use. The washer 60b with the ridge 61 may also take advantage of an alternative embodiment as seen in FIG. 16. The flange may extend and equal the length of the male cup 12 exterior wall 18 thereby creating a complete friction reduction barrier between the male cup 12 wall 18 and the female cup 14 wall 19 as seen in FIG. 16. By extending to the entire length of the male cup 12 wall 18, the flange also increases the stability between the two cups 12, 14 during use.

While the invention has been described as having a preferred design, it is understood that it is capable of further modification, uses and/or adaptations of the invention following in general principle of the invention and including such departures from the present disclosure as come within known or customary practice in the art to which the invention pertains, as may be applied to the central figures herein above set forth and fall within the scope of the invention of the limits of the appended claims.

I claim:

1. A device for comminuting material comprising: first and second mating sections; said mating sections when mated forming an enclosed interior chamber with said sections capable of movement relative to each other; said first mating section having a first set of a plurality of pins extending from a base of first mating section and into the interior of said chamber; said second mating section having a second set of plurality of pins extending from a base of second mating section and into the interior of said chamber; said first set of pins interdigitating with said second set of pins, wherein movement of the first and second mating sections relative to one another causes comminution of the material when placed in the chamber; said first and second mating sections are cylindrical; said first section has a diameter smaller than the diameter of said second section, such that said first section slidably fits into said second section and allows movement of said first section relative to said second section; said second mating section having a rim; and a washer positioned between said base of said first mating section and said rim of said second mating section.

2. The device of claim 1 wherein said washer comprises a low friction material.

3. The device of claim 1 wherein said washer has at least one surface is coated in a low friction material.

4. The device of claim 1 wherein said washer has a flange and an annular portion forming a 90 degree angle.

5. The device of claim 4 wherein said flange extends the length of the wall of the male section.

6. The device of claim 4 wherein said washer contains a ridge protruding from the corner of where said flange and annular portions meet.

7. The device of claim 6 wherein said flange extends the length of the wall of the male section.

8. A method of determining the configuration of a plurality of pins in a cylindrical comminuting device having a first and second mating section, the method comprising the steps of:
1) determining the configuration in a first mating section of a first set of the plurality of pins by:
    a) selecting parameters of the first mating section such that the relationship $D=(n)(d)+S(n-1)+2F$ is satisfied;
    b) determining the maximum number of orbits, O, of the pins for the mating sections such that $O=(n-1)/2$;

where parameter:
    D is the internal diameter of the first mating section,
    d is the maximum cross-sectional distance of a pin,
    S is the minimum distance between a pair of interdigitating adjacent pins,
    n is the total integral odd number of interdigitating pins along a major axis of the mating sections, and
    F is the distance between said pin in the furthest orbit of the second section and the inside wall of the first section;
2) determining a radius of each orbit when the first and second sections are mated such that $2R=2(n)(d+S)$, where parameter:
    R is the radius of an orbit,
    n is the nth orbit; and
3) configuring a second set of the plurality of pins in the second mating section such that the first set of pins and the second set of pins have a distance S when the first and second sections are mated and the first mating section having even $R_n$ orbits and the second mating section having odd $R_n$ orbits.

* * * * *